United States Patent
Wilson

[11] 3,767,874
[45] Oct. 23, 1973

[54] SAFETY MANUAL RACKING MECHANISM FOR DRAWOUT SWITCHGEAR

[75] Inventor: George A. Wilson, Pineville, Pa.
[73] Assignee: I-T-E Imperial Corporation, Philadelphia, Pa.
[22] Filed: Aug. 18, 1972
[21] Appl. No.: 281,702

[52] U.S. Cl. .................. 200/50 AA, 200/153 SC
[51] Int. Cl. ............................................ H01h 9/20
[58] Field of Search .................. 200/50 AA, 153 SC

[56] References Cited
UNITED STATES PATENTS

| | | | |
|---|---|---|---|
| 3,469,043 | 9/1969 | Wilson | 200/50 AA |
| 3,171,938 | 3/1965 | Pokorny | 200/153 SC |
| 3,235,681 | 2/1966 | Pokorny et al. | 200/50 AA |
| 3,188,414 | 6/1965 | Boyden | 200/50 AA |
| 3,632,933 | 1/1972 | McClain et al. | 200/153 SC |
| 3,588,398 | 6/1971 | Siuiy | 200/50 AA |
| 3,578,925 | 5/1971 | Drown et al. | 200/50 AA |

Primary Examiner—J. R. Scott
Attorney—Sidney G. Faber et al.

[57] ABSTRACT

A circuit breaker racking mechanism has a toroidal spring connected between an inner and outer racking shaft. The inner shaft is connected to the cubicle within which the circuit breaker truck is moved while the outer shaft is connected to the manual racking mechanism. The spring serves as a direct mechanical force transmitting connection between the inner and outer racking shafts when the breaker which enters the cubicle is moved to the test position. After the breaker reaches the test position, the inner racking shaft is latched so that continued racking toward the connected position charges the spring connection between the two racking shaft members. The latch may be remotely defeated to release the spring, thereby to complete the racking of the breaker to its connected position under the influence of the charged spring with operating personnel in a remote position.

9 Claims, 5 Drawing Figures

CONNECTED POSITION, SPRING DISCHARGED

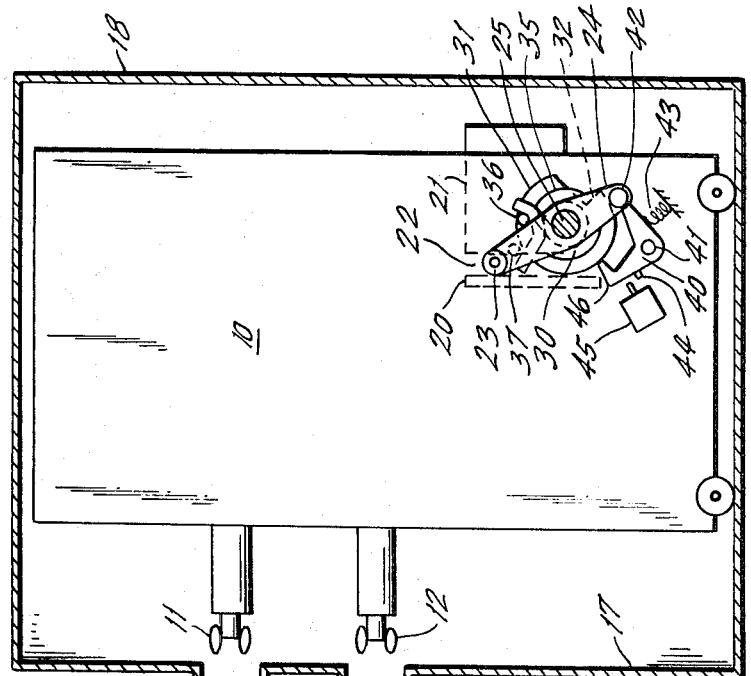
FIG. 2. TEST POSITION
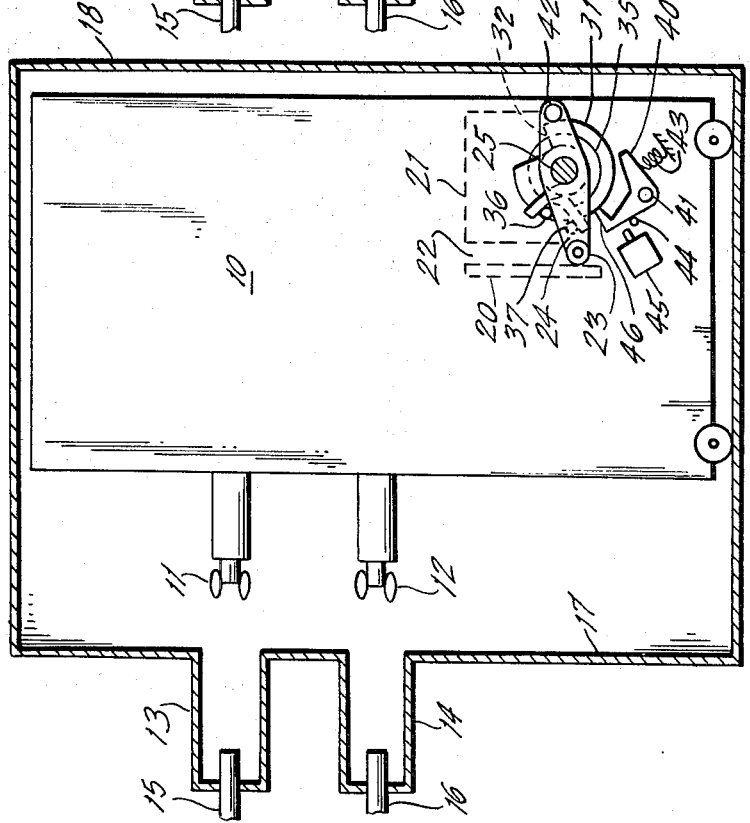
FIG. 1. ENTERING OR WITHDRAWAL POSITION

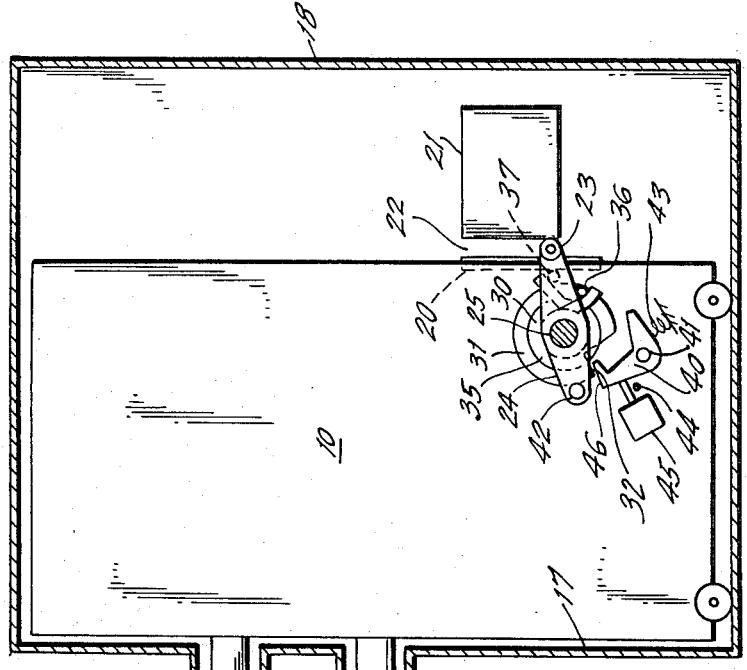
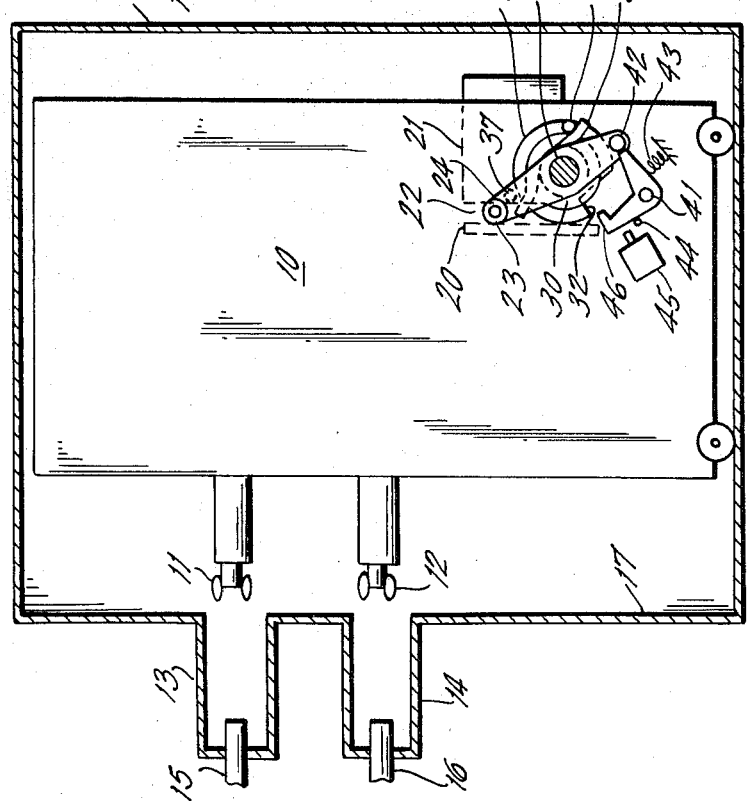

PATENTED OCT 23 1973 3,767,874

SAFETY MANUAL RACKING MECHANISM FOR DRAWOUT SWITCHGEAR

BACKGROUND OF THE INVENTION

This invention relates to a racking mechanism for circuit breakers, and more specifically relates to a novel racking mechanism for circuit breakers using vacuum interrupters, wherein springs in the racking linkage may be charged, so that the breaker may normally be manually racked, but is finally racked to its connected position under the influence of the charged spring.

Vacuum interrupters are commonly used in truck-mounted circuit breakers which are racked between various operating positions within a metal-clad cubicle in the conventional manner. It is possible that air will leak into a vacuum interrupter while the breaker was out of its connected position so that, when the breaker is ultimately racked into its connected position, the open contacts of the vacuum bottle will flash over, thereby creating an extremely hazardous condition, particularly to personnel in direct contact with the breaker mechanism.

BRIEF SUMMARY OF THE INVENTION

The present invention permits operating personnel to rack circuit breakers in the normal manual fashion where, however, the final racking movement of the breaker to its connected position occurs under the influence of a spring-charged mechanism which can be remotely discharged. The racking mechanism of the present invention consists of an outer racking shaft which may be concentrically mounted on an inner racking shaft, where the inner racking shaft is rotatably mounted in the circuit breaker truck. The outer racking shaft is conventionally rotated by a conventional manual racking means, in the conventional fashion, and is connected to a timing disk device.

The outer racking shaft and inner racking shaft are then connected together through a relatively powerful torsion spring which forms a connection between the outer and inner racking shafts which is sufficiently rigid that racking force can be transmitted through the spring and between the inner and outer shafts. Thus, the inner and outer shafts can move as a unit under the influence of the manual racking mechanism.

There is further provided, however, a latch member which operates to latch the inner racking shaft against continued movement once the breaker has reached its test position, with continued racking operation tending to move the breaker toward its connected position. With the latching of the inner racking shaft, continued racking winds or charges the torsion spring which connects the inner and outer racking shafts. Once the spring has been sufficiently charged, the operator, who manually racks the breaker from a position in front of the cubicle, and all other personnel can move to a remote position, and the latch holding the inner racking shaft in its latched position is defeated by an electrically operable solenoid or lanyard, or the like. The breaker truck will now move toward the connected position under the influence of the charged spring connected between the inner and outer shafts. In this fashion, the final movement of the breaker to the connected position is accomplished without requiring operating personnel immediately in front of the breaker so that no hazard exists from the dnager of the breaker moving to its closed position with leaky interrupter bottles which might flash over when the breaker engages the energized circuit.

BRIEF DESCRIPTION OF THE DRAWINGS

FIG. 1 schematically illustrates a truck-mounted circuit breaker, with the breaker being in a position where it has entered the cubicle or where it is ready for withdrawal from the cubicle.

FIG. 2 schematically illustrates the racking mechanism of FIG. 1 with the truck-mounted circuit breaker in its test position.

FIG. 3 illustrates the racking mechanism of FIG. 2 where the inner racking shaft has been latched and the outer racking shaft has been manually racked to charge the operating springs.

FIG. 4 illustrates the breaker of FIGS. 1 to 3 with the springs discharged and the breaker moved to its connected position within the cubicle.

DETAILED DESCRIPTION OF THE DRAWINGS

Figure 5:
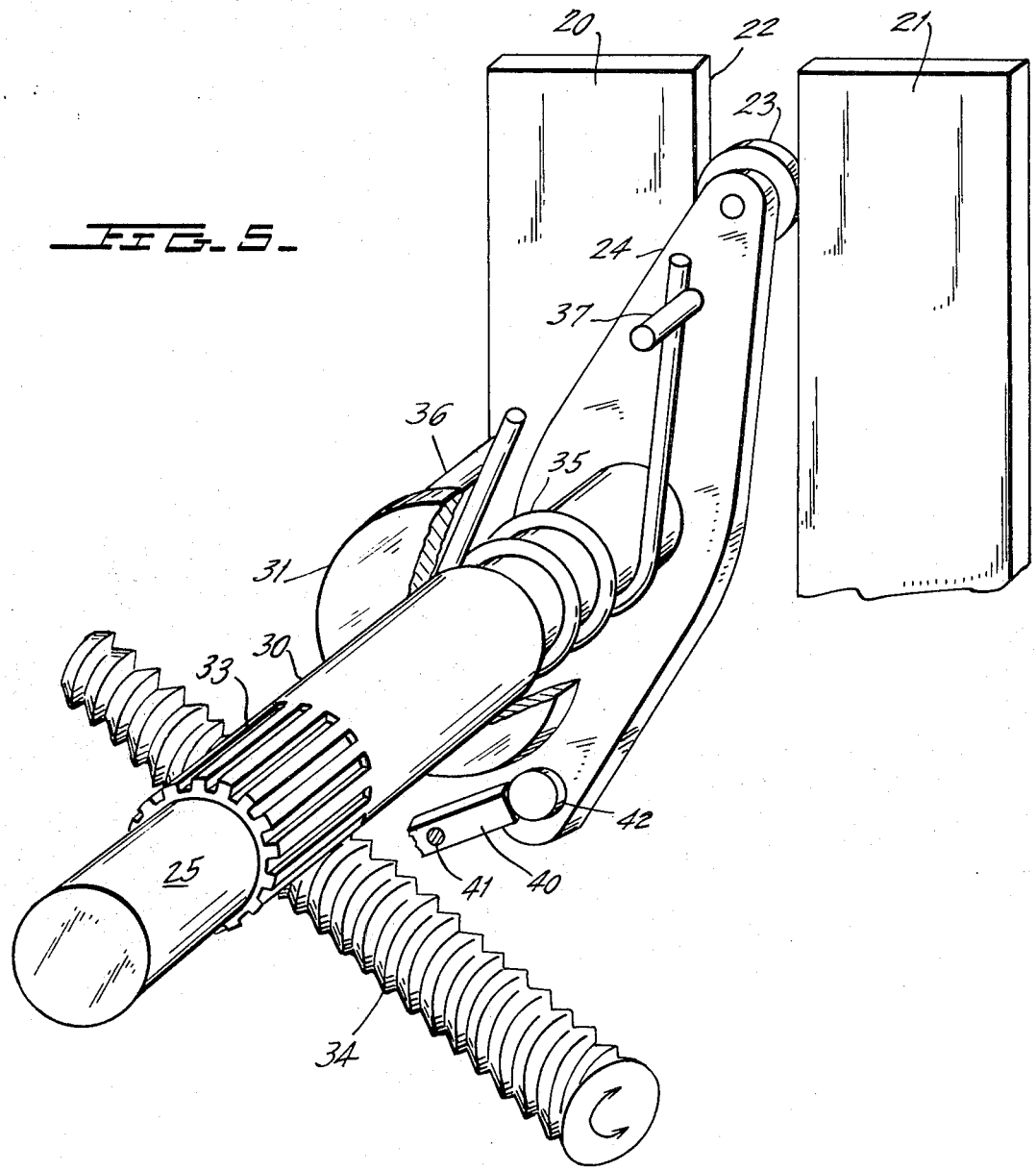
FIG. 5 is a perspective view of portions of the racking mechanism of FIGS. 1 to 4.

Referring now to FIGS. 1 to 4, there is schematically illustrated a truck-mounted circuit breaker 10, where the interrupter units of the circuit breaker may be conventional vacuum interrupters. The breaker has movable disconnect contacts 11 and 12 for each breaker phase (with the other breaker phases lined up behind terminals 11 and 12 in FIGS. 1 to 4). The disconnects 11 and 12 then cooperate with stationary disconnect contacts (stationary contacts 15 and 16 in FIG. 4) which are disposed in sleeves 13 and 14, respectively. Sleeves 13 and 14 are disposed in the rear wall 17 of a conventional steel cubicle which contains the truck-mounted circuit breaker 10. The steel cubicle further contains a front door region 18 which can be opened by operating personnel to gain access to te circuit breaker 10 and to the racking mechanism by which an operator may move the truck-mounted breaker 10 between the positions shown in FIGS. 1 to 4.

Racking mechanisms of the general type which have been used in connection with truck-mounted breakers are well known and one mechanism is typically shown in U.S. Pat. No. 3,235,681, in the name of Pokorny et al, which is assigned to the assignee of the present invention. Indeed, the present invention is specifically an improvement of the mechanism shown in the above-noted Pokorny patent and can be incorporated directly as a component of the Pokorny et al, mechanism. The disclosure of the Pokorny et al, U.S. Pat. No. 3,235,681 shows many of the details which are not necessary for an understanding of the present specific invention, but all of the background information of Pokorny et al, is hereby incorporated by reference into the present disclosure.

In the racking mechanism of FIGS. 1 to 4, a pair of guide plates 20 and 21 are formed in the far side wall of the cubicle to define a slot 22 in which a racking roller 23 is moved in order to move the truck-mounted breaker 10 relative to the steel cubicle within which it is mounted. The racking roller 23 is rotatably mounted on the racking arm 24 which is fixed to inner racking shaft 25 which is, in turn, rotatably mounted on the breaker truck 10. Note that a conventional prior art type manual racking mechanism would simply directly rotate shaft 25, thereby to rotate arm 24, thus moving roller 23 within the slot 22 to, in turn, move the circuit breaker truck 10 within its cubicle and relative to the guide slot 22. This arrangement, however, requires the physical presence of the operator in front of the circuit breaker, to mechanically operate shaft 25 until it reaches the connected position of FIG. 4. As discussed above, this creates a dangerous situation where the circuit interrupters are vacuum interrupters which might have leaked while the circuit was disconnected from the main primary terminals and the energized circuit.

In accordance with the invention, an outer racking shaft 30 is provided which is concentric with shaft 25 and is rotatable relative to shaft 25. The outer racking shaft 30 carries a timing disk 31 which contains a notch 32 (FIGS. 1 to 4), to be described more fully hereinafter. The outer shaft 30 may further contain gear teeth 33 which can be engaged, by way of example, by a worm gear 34 (FIG. 5) which is journalled for rotation within the circuit breaker truck 10, such that rotation of worm gear 32 rotates shaft 30 around its axis.

The outer shaft 30 is connected to the inner shaft 25, in accordance with the invention, through a powerful torsion spring 35. One end of spring 35 is suitably connected to shaft 30 as by being connected to projection 36 of timing disk 31, while the other end of spring 35 is connected to a projection 37 of arm 24, which is connected rigidly to shaft 25. Thus, under normal stresses and with arm 24 free to rotate, rotation of outer shaft 30 will cause similar rotation of shaft 25 due to the connection between these members through the spring 35.

In accordance with the invention, a rotatable latch member 40, which is rotatable about a pivot 41, fixed to the circuit breaker truck 10, has a normal latching position in which latch 40 will latch against latch roller 42 on racking arm 24 when arm 24 reaches a given angular position. The latch 40 is then spring-biased in a counterclockwise direction by the spring 43 against a stop 44 (FIGS. 1 to 4). A solenoid latch defeating means 45 is then provided which can strike the latch 40 to rotate it clockwise in order to defeat the latch when the timing disk 31 is in the correct angular relationship to indicate that the breaker is in the test position, and that the spring 35 is suitably charged to move the breaker to the connected position. That is to say, the latch 40 contains an extension 46 (FIGS. 1 to 4), which normally rides on the outer surface of the timing disk 31. Thus, clockwise rotation of latch 40 is impossible until the notch 32 in the timing disk 31 has moved around the position of FIG. 3.

The operation of the racking mechanism of the invention is as follows:

The breaker enters the cubicle in the conventional fashion and the racking roller 23 is moved into the guide slot 22. The breaker is then racked manually in the conventional fashion as by rotating worm gear 34 of FIG. 5 to cause the clockwise rotation of racking arm 24 from the position of FIG. 1 to the position of FIG. 2 at which time the breaker is in its test position. When the breaker reaches the test position of FIG. 2, the latch roller 42 is engaged by latch 40 so that the continued manual racking or rotation of outer shaft 30 simply causes the charging of spring 35, with the racking arm 24 being held in the position of FIG. 2. Ultimately, the outer shaft 30 and timing disk 31 reach the position shown in FIG. 3, where the racking mechanism spring 35 is fully charged and the notch 32 in timing disk 31 has moved adjacent extension 46 of latch 40.

The operator may now move away from the front of the breaker and to a remote position to either electrically operate the solenoid 45 or to operate a suitable lanyard in order to rotate latch 40 clockwise, as shown in FIG. 4, to release the latching roller 42, and thereby allowing the charged spring 35 to rotate racking arm 24 clockwise until the connected position of FIG. 4 is reached. It should be noted that spring 35 acts directly on the breaker truck 10 during this operation, and that the spring is not required to overcome friction which exists in the rotating devices of the racking mechanism input. It should also be noted that just before the breaker 10 reaches its full connected position, the engagement between the primary disconnects will have a beneficial damping effect on the motion of the breaker.

In order to move the breaker from the connected position of FIG. 4 to a test or withdrawal position of FIG. 2 or 1, respectively, it is only necessary to reverse the rotation of the outer racking shaft 30, whereby the stop pin 36 on the timing disk 31 will directly rotate arm 24 counterclockwise in FIGS. 4 to 1, with the spring 35 not being utilized. Note that the latch 40 is automatically reset by spring 43 before the removal operation occurs.

Although this invention has been described with respect to preferred embodiments, it should be understood that many variations and modifications will now be obvious to those skilled in the art, and, therefore, the scope of this invention is to be limited, not by the specific disclosure herein, but only by the appended claims.

The embodiments of the invention in which an exclusive privilege or property is claimed are defined as follows:

1. A racking mechanism for racking a movable circuit breaker between given positions within a cubicle; said circuit breaker including a frame carrying a pair of cooperating contacts movable between an engaged and disengaged position and a pair of disconnect contacts respectively connected to said pair of cooperating contacts; said cubicle containing a pair of stationary disconnect contacts cooperating with said disconnect contacts mounted on said circuit breaker frame and being engaged and disengaged by said pair of disconnect contacts on said circuit breaker frame as said circuit breaker is moved to different positions within said cubicle; said racking mechanism including:

a first rotatable racking shaft, a second rotatable racking shaft which is rotatable independently of said first rotatable racking shaft, racking roller-type means connected to said second rotatable racking shaft and slidably engaging a stationary guide portion stationarily secured to said cubicle, chargeable spring means having first and second connection portions respectively connected to said first and second rotatable racking shafts to define a force transmitting connection between said first and second rotatable racking shafts, latch means positioned relative to said second rotatable racking shaft to latch said second rotatable racking shaft against rotation beyond a given angular position, and manually operable racking means for manually rotating said first rotatable racking shaft, said second rotatable racking shaft being rotated with said first racking shaft through said spring means for a first angular range of rotation of said first racking means and until said latch means latches said second racking shaft against further rotation to move said breaker to a first position within said cubicle; said first rotatable shaft being rotatable after latching of said second racking shaft to charge said chargeable spring means, and latch defeating means operable after said chargeable spring means is charged to defeat said latch means, whereby said chargeable spring means discharges and rotates said second racking shaft to move said breaker to a second position within said cubicle.

2. The mechanism of claim 1 wherein said circuit breaker contains vacuum interrupters.

3. The mechanism of claim 1 wherein said first and second positions are test and connected positions respectively.

4. The mechanism of claim 2 wherein said first and second rotatable racking shafts are concentric shafts.

5. The mechanism of claim 4 wherein said chargeable spring means is a toroidal spring which is concentric with said first and second racking shafts.

6. The mechanism of claim 1 which further includes timing disk means connected for rotation with said first racking shaft; said timing disk means containing a surface means for defeating the release of said latch means until said first racking shaft is in a given position.

7. The mechanism of claim 6 wherein said circuit breaker contains vacuum interrupters.

8. The mechanism of claim 5 wherein said first and second positions are test and connected positions respectively.

9. The mechanism of claim 8 which further includes timing disk means connected for rotation with said first racking shaft; said timing disk means containing a surface means for defeating the release of said latch means until said first racking shaft is in a given position.

\* \* \* \* \*